US008218877B2

(12) United States Patent
Wu et al.

(10) Patent No.: US 8,218,877 B2
(45) Date of Patent: Jul. 10, 2012

(54) TRACKING VEHICLE METHOD BY USING IMAGE PROCESSING

(75) Inventors: Bing-Fei Wu, Hsinchu (TW); Chao-Jung Chen, Hsinchu (TW); Chih-Chung Kao, Pingtung County (TW); Meng-Liang Chung, Changhua County (TW); Chung-Cheng Chiu, Taoyuan County (TW); Min-Yu Ku, Taipei County (TW); Chih-Chun Liu, Yunlin County (TW); Cheng-Yen Yang, Changhua County (TW)

(73) Assignee: National Chiao Tung University, Hsinchu (TW)

( * ) Notice: Subject to any disclaimer, the term of this patent is extended or adjusted under 35 U.S.C. 154(b) by 810 days.

(21) Appl. No.: 12/318,199

(22) Filed: Dec. 23, 2008

(65) Prior Publication Data

US 2010/0158378 A1    Jun. 24, 2010

(51) Int. Cl.
G06K 9/46 (2006.01)
(52) U.S. Cl. .......................... 382/190; 382/107; 382/164
(58) Field of Classification Search .................. None
See application file for complete search history.

(56) References Cited

U.S. PATENT DOCUMENTS

| | | | |
|---|---|---|---|
| 6,067,114 A * | 5/2000 | Omata et al. | 348/345 |
| 6,616,281 B1 * | 9/2003 | Vlahos et al. | 353/28 |
| 6,678,413 B1 * | 1/2004 | Liang et al. | 382/181 |
| 7,301,562 B2 * | 11/2007 | Belz et al. | 348/207.99 |
| 7,602,937 B2 * | 10/2009 | Mian et al. | 382/100 |
| 7,773,826 B2 * | 8/2010 | Watanabe et al. | 382/274 |
| 2002/0164074 A1 * | 11/2002 | Matsugu et al. | 382/173 |
| 2005/0117779 A1 * | 6/2005 | Horie et al. | 382/103 |
| 2007/0159537 A1 * | 7/2007 | Miyao et al. | 348/223.1 |
| 2008/0181507 A1 * | 7/2008 | Gope et al. | 382/190 |
| 2009/0010492 A1 * | 1/2009 | Muramatsu | 382/103 |
| 2009/0175500 A1 * | 7/2009 | Kizuki et al. | 382/103 |
| 2010/0158378 A1 * | 6/2010 | Wu et al. | 382/190 |

* cited by examiner

*Primary Examiner* — Brian P Werner
*Assistant Examiner* — Tahmina Ansari
(74) *Attorney, Agent, or Firm* — Bacon & Thomas, PLLC

(57) ABSTRACT

The invention relates to a method for image processing. First, establish the initial image background information. And retrieve the instant image information. Then calculate the initial image background information and color intensity information of the instant image. Furthermore, adjust the instant image information. Then calculate the moving-object information. Finally, track the moving-object information. It can improve the accuracy rate of detection without the influence of erected height.

2 Claims, 6 Drawing Sheets

TRACKING VEHICLE METHOD BY USING IMAGE PROCESSING

BACKGROUND OF THE INVENTION

1. Field of the Invention

The invention relates to a method for image processing, particularly to a method for tracking image.

2. Description of the Prior Art

In the conventional technological field of image tracking, such as shown in U.S. Pat. No. 5,402,118, "Method and apparatus for measuring traffic flow", U.S. Pat. No. 7,200,266, "Method and apparatus for automated video activity analysis", and U.S. Pat. No. 6,259,802, "Object tracking technique using polyline contours", the above-mentioned patents provide the reference background image and the instant image to be normally employed to compare and calculate the difference, and then drawing the tracked object contour or using shading value for tracking and detecting. While adopting the above-mentioned calculation method, the camera will activate the automatic white balance function in order to carry on the work in the all-weather environment. As shown in U.S. Pat. No. 7,199,821, "Imaging apparatus and method for controlling white balance", various parameters of white balance and shutter will be adjusted immediately according to the characteristics of the image at that time. When the luminance of picture is too bright, the parameters will be adjusted to reduce inlet light quantity. When the luminance of picture is too low, the inlet light quantity will be increased so that the color of whole picture can reach a steady state.

After the white balance function of camera is activated, the background and tone of detected object will be changed; also will influence the tracking accuracy of image. For example, when the large vehicles pass through the detected area of camera, the white balance function of camera will be activated soon. Due to the whole detected area of camera becoming totally color occupation by the large vehicles, therefore the image of camera would be whole changed, also the detected object is unable to be judged accurately. Furthermore, the large vehicles usually pass through the outer traffic lane, thus the effective detection for the image of roadside vehicle detector will also be influenced.

Besides using white balance function of the above-mentioned camera to process the image tracking, there are other processing ways for the change caused by the natural weather and light. That is, also in the conventional image treatment, the image is adjusted by using image background renewing method.

As shown in Taiwan Patent I220,969, the detected image and initial background image can be compared to obtain a difference value. When the difference value is higher than a threshold value, it will be necessary to be upgraded. However, the upgrade speed of the above-mentioned method is quite slow, which is unable to process the change of light properly and instantly.

In order to respond the requirement of image tracking, the invention develops the relevant technologies for tracking and calibration of image, to improve the tracking result, to save the cost of manpower and time, and to promote the development of relevant technologies.

SUMMARY OF THE INVENTION

The invention employs the reverse-direction color calibration technology to solve the wrong judgment problem of object detection due to utilization of the white balance function of camera, in order to improve the accuracy of detected object.

The invention relates to a method for tracking image processing. Firstly, establish the initial image background information. And then retrieve the instant image information. Adjust and process the white balance state of the instant detection image information in order to generate the new instant detection image information. Then calculate the moving-object information. Finally, track the moving-object information.

The invention can improve the accuracy ratio of detected object without raising height of the camera.

The tracking image method of the invention can obtain the image of tracked object rapidly to save the tracking time.

The invention can be applied to the vast image detecting system, and its function is superior to the existing image system. Therefore, the advantage and spirit of the invention can be further understood by the following detailed description and figures.

BRIEF DESCRIPTION OF THE DRAWINGS

The foregoing aspects and many of the attendant advantages of this invention will become more readily appreciated as well becomes better understood by reference to the following detailed description, when taken in conjunction with the accompanying drawings, wherein.

DESCRIPTION OF THE PREFERRED EMBODIMENT

Figure 1:
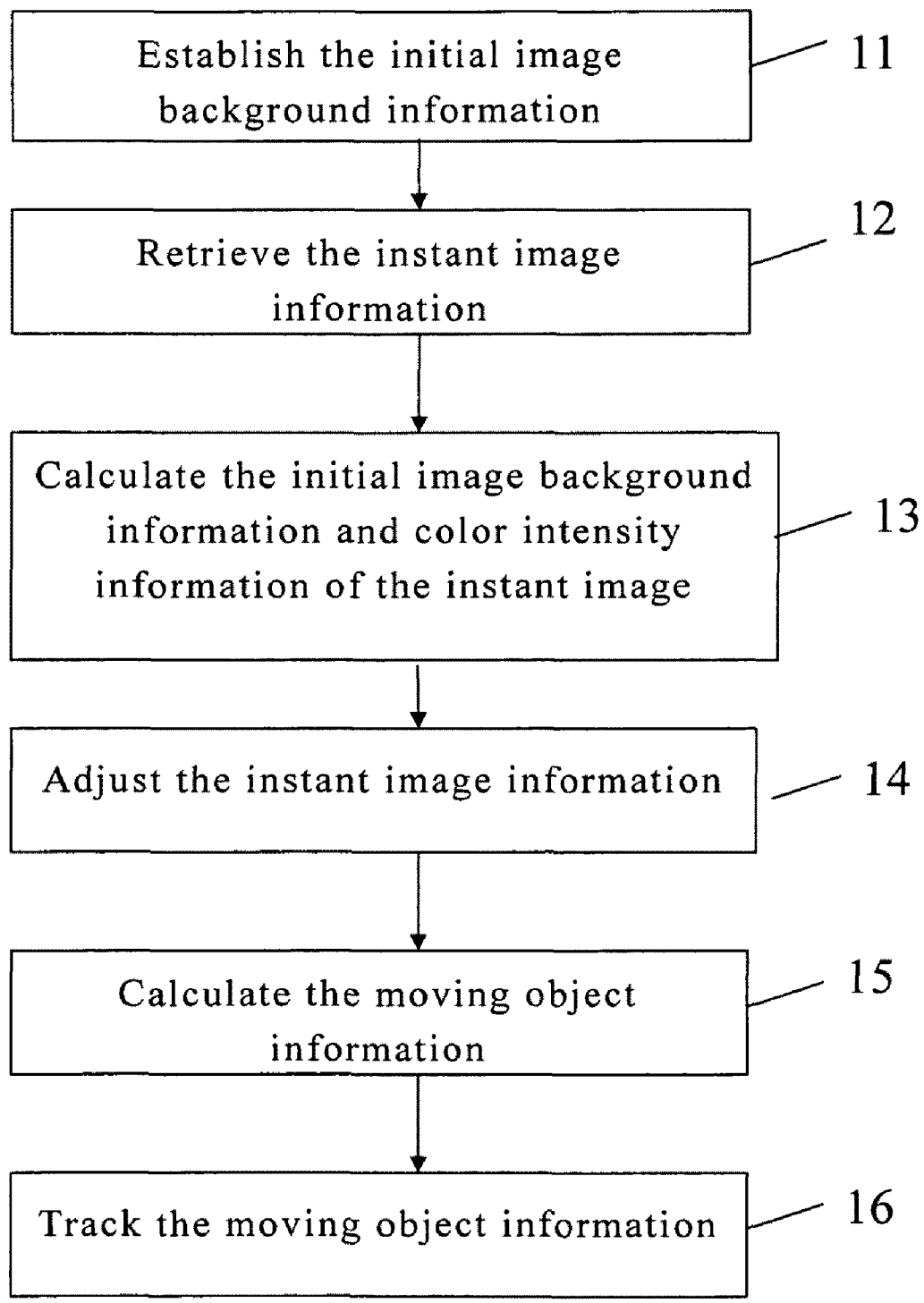
FIG. 1 shows the flow chart for a preferred embodiment of the invention.

The invention proposes a method for tracking image. Referring to FIG. 1, it is the flow chart of the method, which describes a preferred embodiment of the invention.

The invention relates to a method for tracking image. As shown in Step 11 of FIG. 1, the initial image background information is established firstly. That is the background information of color image.

As shown in Step 12 of FIG. 1, the instant image information is retrieved. The first input image will be used as the first category of every pixel color category at this color image background information retrieving stage.

As shown in Step 13 of FIG. 1, the initial image background information and color intensity information of the instant image both are calculated, wherein the color intensity information is the maximum value of a statistical quantity, including the gray intensity and branched color intensity. Thus the Sum of Absolute Difference (SAD) is used to calculate the difference between every color category of each pixel and the pixel of input image. If the difference is large, a new category is set for this color. On the contrary, the pixel is set as a "known" category, and the color information is renewed. It is repeated again and again until the maximum probability category appearance of each pixel being converged. When the first instant detecting image information and the initial image background information are under the same luminance condition, the error value will be very small between the background color density of the first instant detecting image information and the initial image background information, and the error value is centralized distribution. The image intensity may be one-dimensional gray intensity or three-dimensional branched color intensity. The error value can be calculated by equation (1).

$$Er_{ij} = I_{ij} - B_{ij} \forall i, j \quad (1)$$

Wherein $B_{ij}$ is the value of initial image background information on the abscissa and ordinate of image picture. $I_{ij}$ is the value of first instant detecting image on the abscissa and ordinate of image picture. Wherein i is the abscissa, and j is the ordinate. When the difference of the initial image background information and the first instant image information is taken, its absolute value will be the image of Moving-object Sum of Absolute Difference (MSAD). If the MSAD of certain pixel is greater than a dynamic critical value $M_{TH}$, the pixel will be categorized as a moving-object. On the contrary, the pixel will be categorized as a background. The obtained moving-object shield can be shown by equation (2).

$$\text{Moving object shield} = \begin{cases} 1 & MSAD(i, j) < M_{TH} \\ 0 & \text{Others} \end{cases} \quad (2)$$

Wherein, dynamic critical value $M_{TH}$ refer to the positive and negative standard deviation of $Er_{ij}$ difference value calculated by using accounting analysis.

As shown in Step 14 of FIG. 1, the instant image information is adjusted. When the automatic white balance function is activated, the luminance of picture will be automatically adjusted by the color intensity of filmed picture. Thus the error value between the instant detecting image background information and the initial image background will be increased gradually. The invention also refers to background color to carry out the modification. After the background picture is obtained by selecting the suitable threshold value, then the moving-object part in the image is found. Due to the light will cause the error for extracting the moving object, so that the suitable threshold value will be selected. Through the above-mentioned absolute difference and statistical information, the dynamic adjustment value of the suitable threshold can be carried out. The dynamic adjustment value of color intensity normally comprises a corresponding difference value in a maximum value of the difference value statistical amount. An edge feature can also be used to extract the moving object information, and a horizontal and vertical projection amount also be used to extract the moving object information.

As shown in Step 15 of FIG. 1, the moving object information is calculated. The first moving object information can be obtained by the calculation of dynamic critical value. The moving object information includes real objects and noise. The invention compares and extracts by using the horizontal and vertical projection amount and edge feature to obtain real information of the moving object. At the same time, calculate the grey characteristic of the moving object information and the initial image background information to judge a shadow part of the moving object information, then minus the shadow part by using the moving object information leaves the second moving object information.

As shown in Step 16 of FIG. 1, tracking the moving object information is processed. For tracking the object, all the basic principle of the algorithm will be the followings:

1. Owning the whole tracking (coming from the image edge, leaving to the setting direction);
2. Object will not appear suddenly;
3. Object will not disappear suddenly; and
4. Object will not move suddenly.

The figures of error value versus its probability are drawn in the invention, which are shown in FIG. 2 to FIG. 5. Where the abscissa x is $Er_{ij}$ value, and the ordinate p(x) is the statistical points of the difference value for the first instant detecting image information and the initial image background information.

Figure 2:
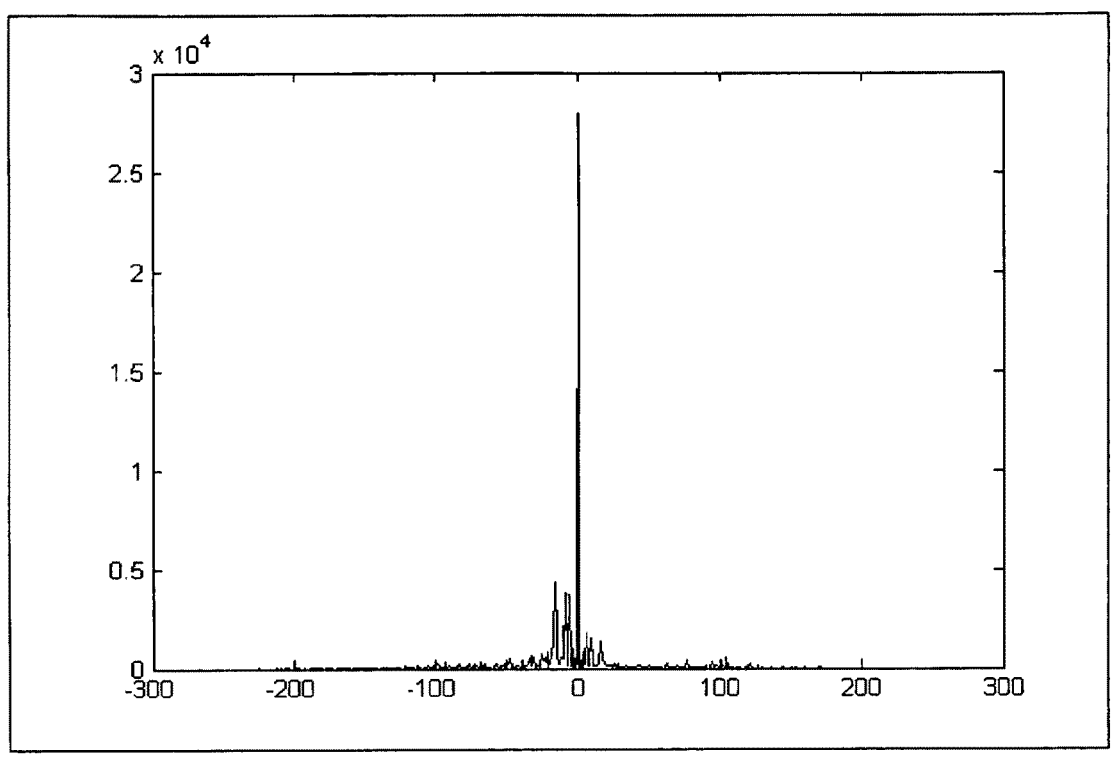
FIG. 2 to FIG. 5 show the figures of error value versus its probability.

As shown in FIG. 2, when most of the first instant detecting image information are composed by the background element of nonmoving object, the difference of the first instant detecting image information and the initial image background information will be fallen into a minimum distribution area.

In FIG. 2, a maximum value $p_{max}(x_m)$ of the statistical amount of error value is taken, wherein $x_m$ is referred to the $P_{max}$ abscissa value on the statistical drawing. Due to $p_{max}(x_m)$ of the statistical amount of error value is located around zero value of the abscissa value, $x_m$ can be considered as the mean difference of the first instant detecting image information and the initial image background information. Due to the initial image background information will not be changed with respect to time, it is expected that $x_m$ will be located in a minimum range.

Figure 3:
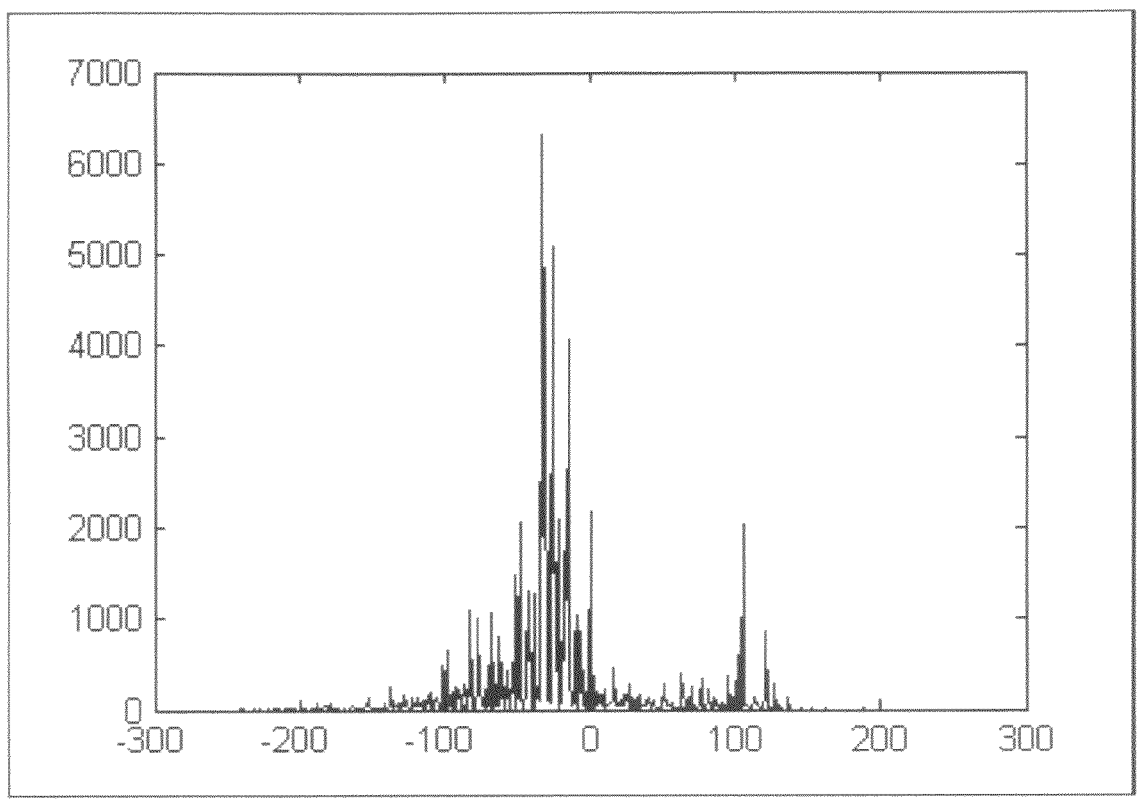

FIG. 3 shows the figure for the error value generated by the moving object passing through in the instant detecting image information. The maximum value of the statistical amount of the error value will be normally located around $x_m$, it is near zero value in this embodiment. However, $x_m$ will be moved far from away zero value point due to the activation of white balance.

Figure 4:
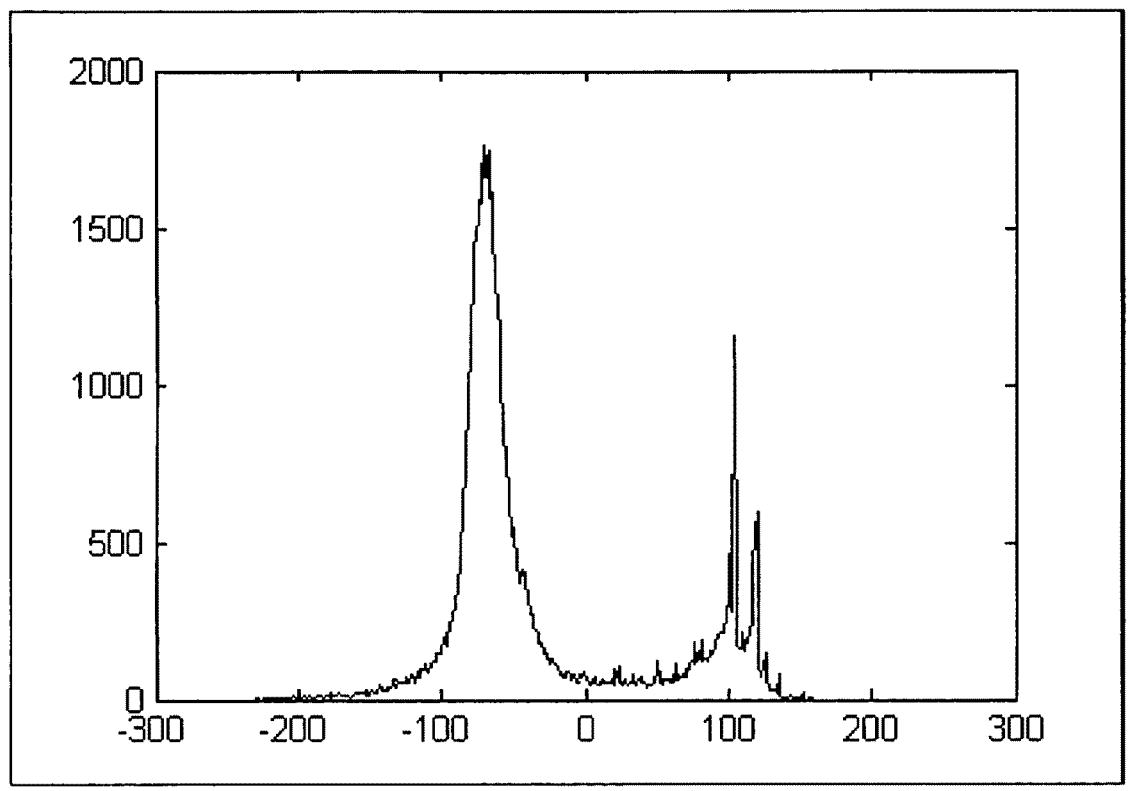

As shown in FIG. 4, when large object is passing and the automatic white balance function is activated, the difference value of the first instant detecting image information and the initial image background information will be deviated from zero value of the abscissa. Thus, the concept for the deviation amount of $x_m$ value deviating away from zero point is employed to adjust color intensity. When the color of first instant detecting image information is moved from $x_m$ to $x_{m'}$, and let $x_{m'}$ become zero, the second instant detecting image information will be generated.

Figure 5:
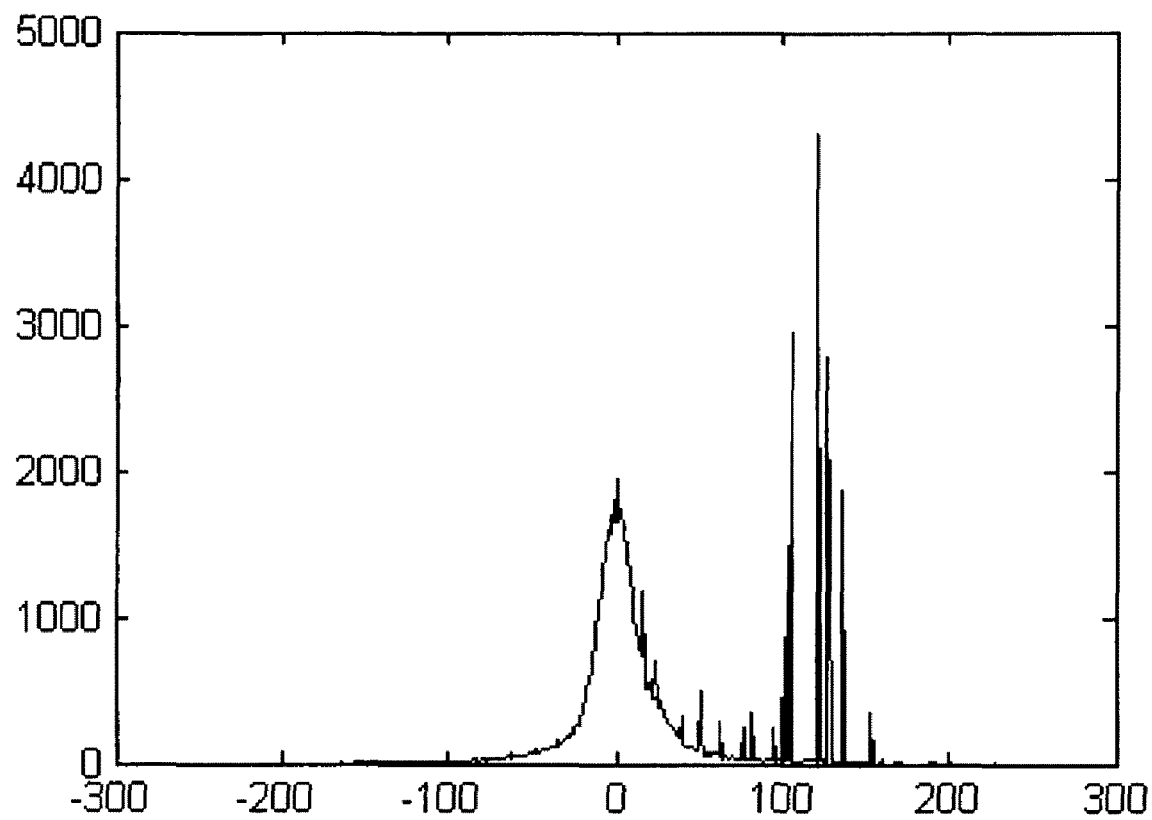

FIG. 5 shows the diagram for the difference between the adjusted second instant detecting image information and the initial image background information, and the total account of point number of the error value versus its probability.

For tracking the image, image tracking of the object is incorrect due to the shadow part will cause overlap situation, so that the shadow will be delete. The shadow part belongs to the gray color, which is described by the tone, degree of saturation and luminance (as equation (3)), and its tone value is quite low. Thus this can describe the gray characteristics of shadow, and set up the possible shadow area.

After the possible gray color is selected by the tone H, the characteristics of its gray intensity shall be considered. The generation of shadow is due to the direct sunlight being shielded, and a color block having the lower gray intensity will be generated on the road surface. Thus the color intensity information I is added to separate the road surface and shadow, that both are the gray characteristic.

Because the shadow is almost located on the road surface, and its color intensity is relatively even, thus it does not have the high-frequency characteristics. Thus, gradient is used to scan the possible shadow block with lower gradient characteristic area, the position of shadow block can be determined more accurately, wherein the Sobel operator can be used to carry out.

Figure 6:
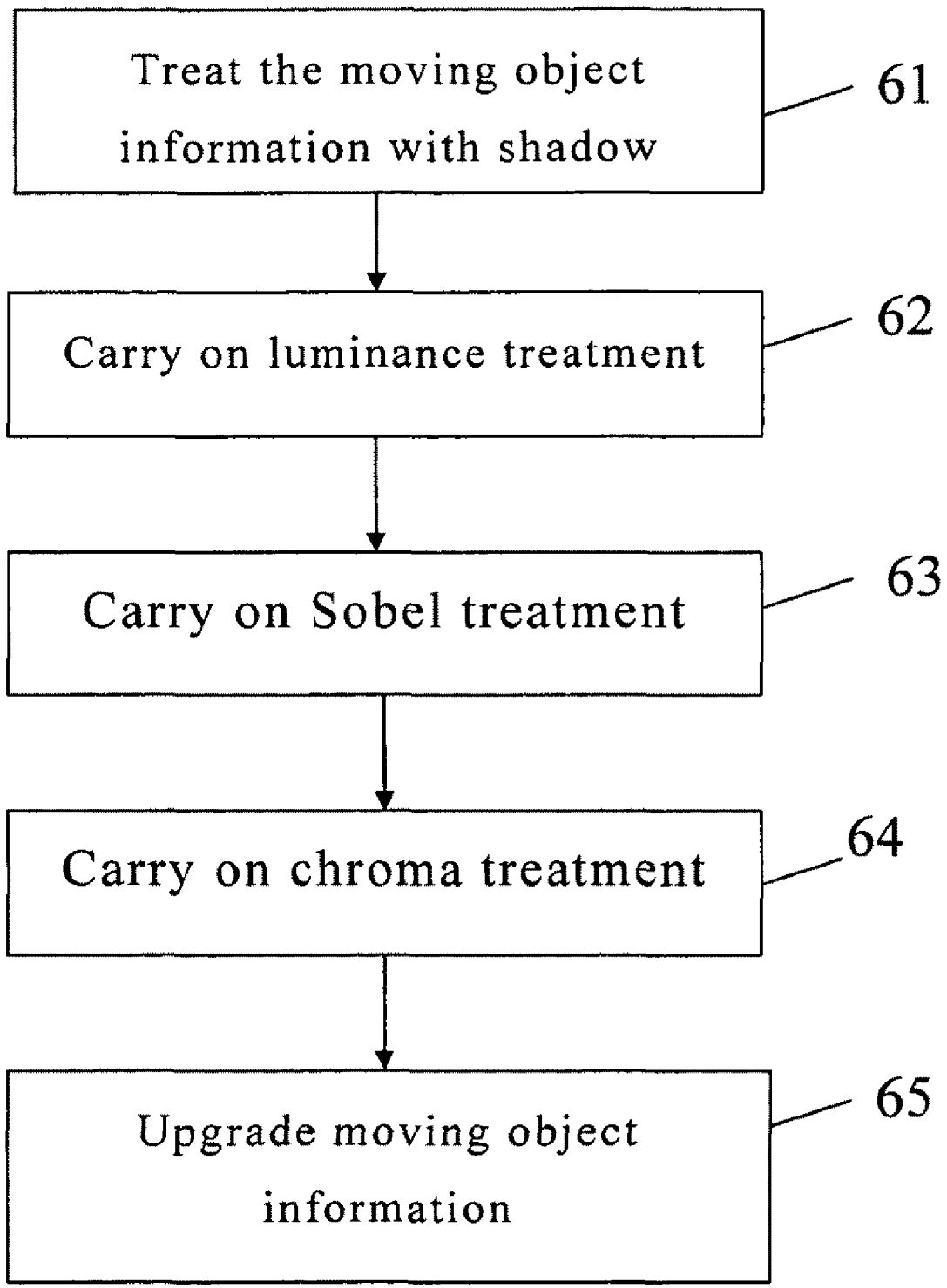
FIG. 6 the flow chart for the elimination of shadow.

As shown in FIG. 6, the invention employs the luminance of shadow, Sobel and statistical feature of chroma to eliminate the shadow part. The steps will include: treat the moving object information having shadow 61; carry out luminance treatment 62; carry out Sobel treatment 63; carry out chroma treatment 64 and update moving object information 65. As for the image tracking of object, the shadow will always generate the overlap, which will cause incorrect image tracking of object, thus the shadow part shall be eliminated.

HIS is based on RGB color model transferring $$H = \begin{cases} \theta, & \text{if } B \leq G \\ 360 - \theta, & \text{if } B > G \end{cases} \quad \text{equation (3)}$$

where $$\theta = \cos^{-1}\left\{\frac{\frac{1}{2}[(R-G)+(R-B)]}{[(R-G)^2+(R-B)(G-B)]^{\frac{1}{2}}}\right\}$$

$$S = 1 - \frac{3}{R+G+B}[\min(R, G, B)]$$

$$I = \frac{1}{3}(R+G+B)$$

After the moving object is found in the above-mentioned Step 16 of FIG. 1, i.e., after finding the moving object, every object will be marked for the further tracking later. Linking object is to mark the present object, and then mark the adjacent points to the same mark, which represents the same object, so that the follow-up treatment can be made. To determine whether two moving points are linked as the same object, it has to judge whether these two moving points are adjacent firstly, that is to say they are located at upper left, up, upper right, left, right, down left, down, and down right positions. If these two moving points appear in one of these 8 positions, it represents these two moving points are linked, which can be regarded as the same moving object. For linking, a table is required to record the relationship of mark values. All relationship are from large number to small number. Scan the picture from the upper left corner of the image to the lower right corner firstly. When a moving point is met, search upper left, up, upper right, and left positions to see whether the points existing. If there is only a moving point, the label will be the same mark. If there are two or more moving points, the mark will be different. Take the minimum mark value, and add the relationship into the table. Relate the mark value of upper left, up, upper right, and left positions to the minimum mark value. If there is no more moving point, mark a new value and continue to deal with the next moving point. The invention does not need to scan the renew table repeatedly upon using the linking method. After scanning the image once back and forth, reset the obtained table with complete linking information. Scan the first mark value of table to the last mark value. When the last mark value is scanned, the marks are refilled to its original image according to the value of relationship, in order to finish the linking of objects.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A new method of tracking a vehicle using image processing, comprising:
   establishing background information of a color image;
   retrieving first instant detecting image information;
   calculating said background information of said color image and color intensity information of said first instant detecting image information, wherein said color intensity information is a maximum value of a statistical quantity including a gray intensity and a branched color intensity by a Sum of Absolute Difference method;
   adjusting said first instant detecting image information, wherein when an automatic white balance function is activated, luminance is adjusted by said color intensity information;
   calculating a dynamic adjustment value of color intensity of said background information including said gray intensity and said branched color intensity, wherein said dynamic adjustment value of color intensity comprises a corresponding difference value in a maximum value of a difference value statistical amount;
   calculating moving object information including real objects and noise, wherein first moving object information is obtained by calculation of a dynamic critical value;
   comparing and extracting said moving object information by using a horizontal and vertical projection amount and edge feature to obtain real information of said moving object;
   calculating a grey characteristic of said moving object information and said background information of a color image to judge a shadow part of said moving object information, and subtracting said shadow part by using said moving object information leaving a second moving object information; and
   tracking said second moving object information.

2. The method according to claim 1, wherein eliminating a shadow part comprises: treating a moving object information having shadow; carrying out a luminance treatment; carrying out a Sobel treatment; and carrying out a chroma treatment and updating said moving object information.

* * * * *